US011892591B2

(12) United States Patent
Ghosh et al.

(10) Patent No.: US 11,892,591 B2
(45) Date of Patent: Feb. 6, 2024

(54) METHOD FOR PREDICTING CASED WELLBORE CHARACTERISTICS USING MACHINE LEARNING

(71) Applicant: Visuray Intech Ltd (BVI), Tortola (VG)

(72) Inventors: Payel Ghosh, Spring, TX (US); Melissa Spannuth, Houston, TX (US)

(73) Assignee: Visuray Intech Ltd (BVI), Road Town (VG)

(*) Notice: Subject to any disclaimer, the term of this patent is extended or adjusted under 35 U.S.C. 154(b) by 50 days.

(21) Appl. No.: 17/409,420

(22) Filed: Aug. 23, 2021

(65) Prior Publication Data
US 2022/0043179 A1 Feb. 10, 2022

(51) Int. Cl.
| | |
|---|---|
| *G01V 5/12* | (2006.01) |
| *E21B 47/085* | (2012.01) |
| *G01V 1/50* | (2006.01) |
| *G01V 5/00* | (2006.01) |
| *G06N 20/00* | (2019.01) |

(52) U.S. Cl.
CPC .............. *G01V 5/12* (2013.01); *E21B 47/085* (2020.05); *G01V 1/50* (2013.01); *G01V 5/0025* (2013.01); *G06N 20/00* (2019.01); *E21B 2200/20* (2020.05)

(58) Field of Classification Search
CPC .......... G01V 5/12; G01V 1/50; G01V 5/0025; G01V 3/18; G01V 11/00; E21B 47/085; E21B 2200/20; E21B 47/00; E21B 47/005; E21B 47/006; E21B 2200/22; G06N 20/00; G06N 3/045; G06N 3/08
See application file for complete search history.

(56) References Cited

U.S. PATENT DOCUMENTS

| | | | | |
|---|---|---|---|---|
| 2018/0025269 A1* | 1/2018 | Dursun | ................... | E21B 41/00 175/24 |
| 2018/0180765 A1* | 6/2018 | Teague | ...................... | G01V 5/12 |
| 2022/0120176 A1* | 4/2022 | Gutarov | .................. | E21B 44/02 |
| 2022/0178242 A1* | 6/2022 | Yuan | ...................... | G06N 20/00 |
| 2022/0325613 A1* | 10/2022 | Xu | ......................... | G06N 20/00 |

FOREIGN PATENT DOCUMENTS

DE 102015216780 A1 * 3/2016 ............. A61B 34/10

* cited by examiner

*Primary Examiner* — Catherine T. Rastovski
*Assistant Examiner* — Yossef Korang-Beheshti
(74) *Attorney, Agent, or Firm* — Adams and Reese LLP; Ray R. Ferrera (57) ABSTRACT

A method for well integrity assessment using machine-trained prediction of physical characteristics related to well integrity across a depth interval of a cased wellbore having one or more casing strings. The method includes collecting scattered X-ray signals from a plurality of X-ray detectors arranged within a well logging tool, learning trained weights to predict wellbore characteristics from the scattered X-ray signals, collecting further scattered X-ray signals from the X-ray detectors, using the trained weights to quantitatively predict the wellbore characteristics from the further X-ray signals, and using the predicted wellbore characteristics to assess well integrity.

19 Claims, 8 Drawing Sheets

METHOD FOR PREDICTING CASED WELLBORE CHARACTERISTICS USING MACHINE LEARNING

TECHNICAL FIELD

The present disclosure relates generally to well logging in oil and gas fields. In particular, the disclosure relates to predicting wellbore characteristics in a cased well in order to assess well integrity and cement integrity.

BACKGROUND

Within the oil and gas industry, operators are required to maintain the integrity of their wells in order to minimize the chance of uncontrolled release of hydrocarbons. Accepted industry standards, such as NORSOK D-010, require the placement and verification of multiple barriers between hydrocarbons in the well and the surface. Such barriers can include one or more steel casings, cement pumped into the one or more annuli created between the casings and the formation, or extremely-low-permeability formations, such as shale. Operators are required to assess and ensure the integrity of each barrier element throughout the lifecycle of the well.

The industry currently employs various methods to perform these well integrity assessments. A variety of tools are available for assessing casing integrity, including mechanical calipers and tools employing electromagnetic or nuclear magnetic resonance techniques. However, these tools cannot assess the quality of cement in the annulus or the integrity of a second or further casing.

Acoustic tools operating at frequencies ranging from sonic to ultrasonic are typically used for this purpose, particularly when trying to assess the quality of cement in the annulus between a casing string and the formation. However, acoustic tools are highly dependent upon the fluid in the wellbore, the quality of the casing, the bond between the casing and the material in the annulus, and the mechanical properties of the material in the annulus to permit accurate interpretation of the data. Furthermore, interpretation of acoustic data in wells with two or more casing strings and annuli is often ambiguous.

Recently, tools using X-rays to inspect or obtain information about the structures within or surrounding the borehole of a water, oil or gas well have been introduced. These tools use a variety of methods and means to obtain measurements relevant to assessing well integrity. They provide radially and azimuthally resolved data about the amount of X-ray scattering from one or more casings, materials in one or more annuli, and the formation. X-ray based tools do not need a priori information about the wellbore to interpret the data and work in multi-string wells or when the cement is de-bonded from the casing.

Regardless of the type of tool used, the data collected must be processed and interpreted to provide the information operators need in order to assess well integrity. Traditionally, this processing and interpretation is done by expert well log interpreters, i.e., humans with many years' experience in well logging. However, recently, machine learning techniques have been applied to well log interpretation. Machine learning involves learning from data to statistically estimate complex functions or relationships between dependent and independent variables in the data instead of explicitly coding them. Algorithms that learn from prior labeled examples (training data) are called supervised, whereas algorithms that find the inherent patterns in the data without using labeled examples are called unsupervised algorithms. Machine learning tasks can be broadly categorized into classification and regression, where the former involves grouping data into known groups, while the latter involves learning to make predictions for forecasting or maintenance purposes.

As acoustic tools are a commonly used tool type for well integrity evaluation, most efforts at using machine learning in well integrity evaluation have been focused on data from these types of tools. Specifically, such applications of machine learning have focused on classifying the cement quality, hydraulic isolation, or general integrity of individual depth intervals of a well according to qualitative classes, such as "good"-"moderate"-"poor" or "isolated"-"not isolated". Machine learning has not been applied towards processing acoustic log data to predict quantitative physical characteristics of a well relevant to well integrity.

Machine learning has also been suggested for processing data from X-ray tools. These applications have focused on processing of spectral data to obtain information about the materials being investigated, re-tessellating X-ray images to adjust for logging speed and tool rotation or identifying features relevant to well integrity. Again, machine learning has not been applied towards processing X-ray log data to predict quantitative physical characteristics of a well relevant to well integrity.

SUMMARY

The present disclosure teaches a method for well integrity assessment using machine-trained prediction of physical characteristics related to well integrity across a depth interval of a cased wellbore having one or more casing strings. The method includes collecting scattered X-ray signals from a plurality of X-ray detectors arranged within a well logging tool, learning trained weights to predict wellbore characteristics from the scattered X-ray signals, collecting further scattered X-ray signals from said plurality of X-ray detectors, using the trained weights to quantitatively predict the wellbore characteristics from the further X-ray signals, and using the predicted wellbore characteristics to assess well integrity.

BRIEF DESCRIPTION OF EXAMPLE EMBODIMENTS

This disclosure describes a method for well integrity assessment using machine-trained prediction of physical characteristics related to well integrity across a depth interval of a cased wellbore having one or more casing strings. The method uses scattered X-ray signals recorded on a plurality of X-ray detectors arranged within an X-ray well logging tool.

X-rays are well-known in the art for their ability to penetrate through materials opaque to other types of electromagnetic radiation, including materials commonly found in oil wells such as oil, steel, cement, and rock. This makes X-ray based tools good candidates for interrogating well characteristics related to well integrity. X-ray based well logging tools are known in the art with several means and methods taught.

Figure 1:
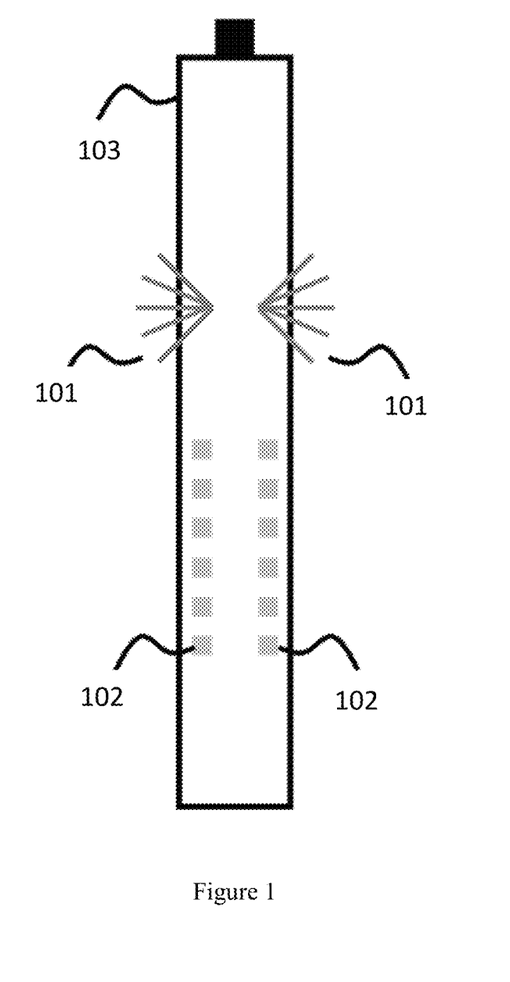
FIG. 1 is a schematic illustration of an X-ray based well logging tool.

FIG. 1 illustrates a typical configuration of an X-ray based well logging tool. The general format includes a source of X-rays 101 and a plurality of axially-offset detectors 102. The X-ray source, detectors, and any necessary electronics are enclosed in a pressure housing 103 to isolate them from the harsh well conditions. The source of X-rays can be shaped into a beam having any desired beam configuration using techniques known in the art or new techniques. The plurality of axially-offset detectors can be of any number greater than one and can be configured in any arrangement desired. The plurality of detectors can be arranged along a single azimuth of the tool or azimuthally distributed around the tool. Further, the plurality of detectors can be spaced evenly or unevenly in each of the axial and azimuthal directions, and the dimensions of said spacing can be any deemed favorable to the measurement. The detectors can be uncollimated or collimated in any manner desired. Prior art suggests several possible arrangements and designs for the X-ray based well logging tool.

Figure 2:
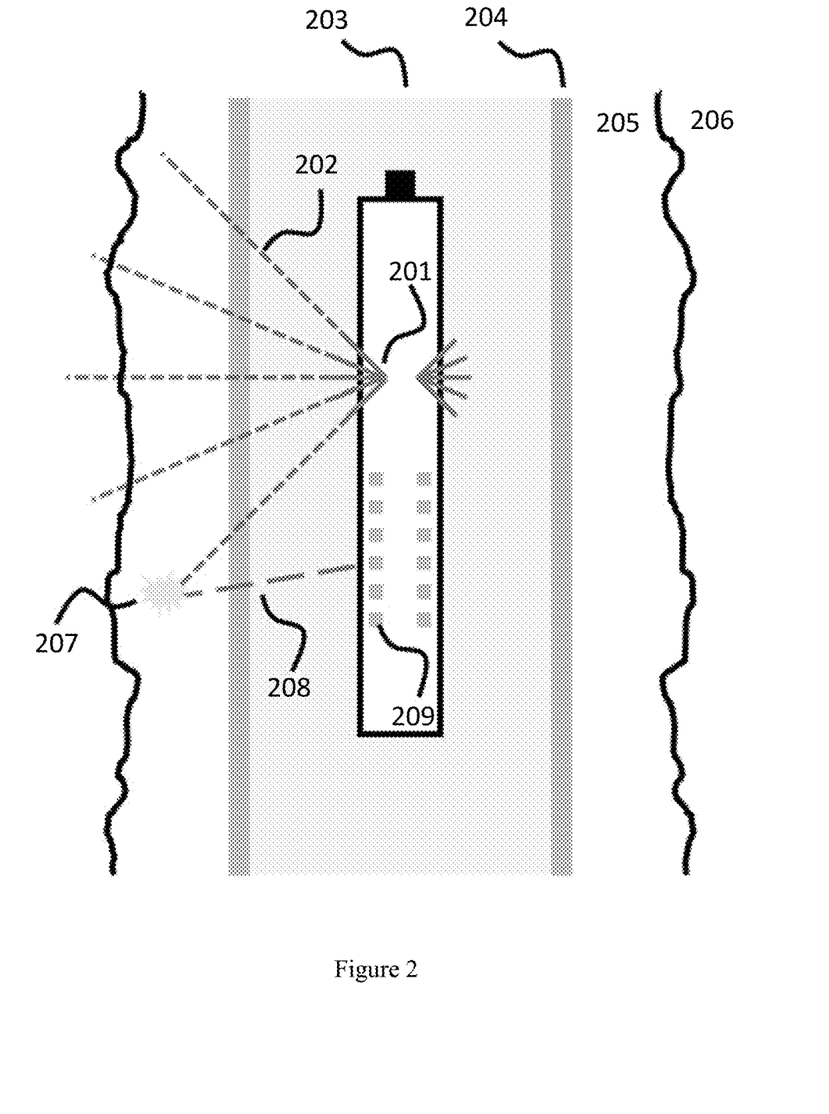
FIG. 2 is a schematic illustration of the concept of X-ray scattering measurements in a wellbore.

FIG. 2 illustrates the measurement concept. The source 201 emits X-rays 202 into the well and surrounding formation. The emitted X-rays travel through the various materials surrounding the tool, such as the well fluids 203, the one or more casings 204, the materials in the one or more annuli 205, and the formation 206. While traveling through these materials, the X-rays can undergo one or more scattering events 207 or an absorption event, or they can pass through without interacting. X-rays 208 that undergo one or more scattering events lose some of their energy during the event but can be redirected towards a detector 209 where they are recorded as the scattered X-ray signal.

The signal received at any particular detector depends upon the amount of scattering and absorption occurring in the illuminated material within the field-of-view of that detector. Scattering and absorption both depend upon the composition and density of the materials in which these processes are occurring; specifically, they depend upon the electron density and average atomic number of the material. Furthermore, the total amount of scattering and absorption occurring depends upon the amount of material present. Typically, the detectors closest to the source are most sensitive to changes in the material or geometry closest to the tool radially, such as the well fluid or casing, and not very sensitive to changes in the material or geometry farther from the tool radially, such as the outer annulus or formation. The detectors furthest from the source are also sensitive to changes in the material or geometry closer to the tool radially but are much more sensitive than the detectors closer to the source to changes in the material or geometry farther from the tool radially. In this way, the signal at each detector reflects the density, composition, and physical arrangement of the materials within and around the wellbore.

As an example, consider a scenario in which the cement in the annulus 205 in FIG. 2 is exchanged for water as would happen if there was a channel in the annular cement. The water has lower density than the cement, so the contribution of the annular region to the scattered X-ray signal at the detectors decreases. However, the amount of attenuation (scattering and absorption combined) from the beam passing through the annulus also decreases, allowing more X-rays to reach the formation 206 beyond and thus increasing the contribution of the formation to the scattered X-ray signal at the detectors. The sign and magnitude of the change in detected signal for each detector will depend upon the exact source and detector configuration as well as the details of the well materials and geometry.

Figure 3:
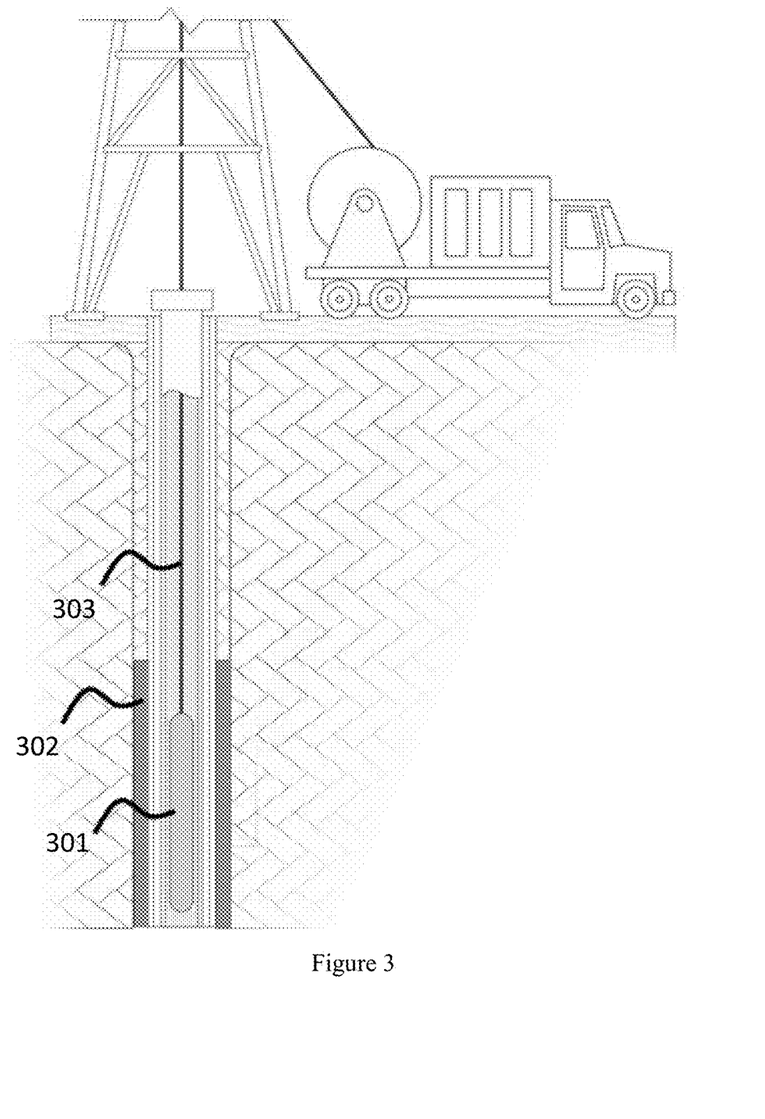
FIG. 3 is a schematic illustration of well logging with an X-ray based well logging tool.

To collect X-ray scattering measurements in a well, the X-ray based well logging tool 301 is lowered into and moved axially through the well 302 using a wireline cable 303 as shown in FIG. 3. Alternately, coiled tubing or drill pipe could be used to lower into and move the tool through the well. Typically, the detectors record scattered X-ray signals in repeated fixed time intervals (exposures) as the tool moves continuously through the well. Because the tool is moving during each exposure, the data collected during the exposure reflect the well characteristics across some small depth interval. As the tool moves through the well, the repeated exposures build up a log of scattered X-ray signal versus depth in the well. These scattered X-ray signals are transmitted to the surface to be plotted or analyzed further. The present invention is oriented towards a method for this analysis.

Due to the density and geometry of the materials in and surrounding an oil well, the X-rays will undergo multiple scattering events between the source and any of the plurality of detectors. This multiple scattering combined with the high attenuation of some well materials (e.g., steel in the casing) causes the detected signal to respond in a highly non-linear manner to perturbations in the well materials or geometry. As a result, standard procedures for processing X-ray scattering data, such as tomographic inversion techniques, and standard procedures for processing well logging data are not sufficient. Instead, the present invention uses machine learning techniques to further analyze the scattered X-ray data.

Machine learning algorithms are useful for complex tasks that are too difficult to solve with manually designed computer programs. For supervised learning, a collection of features that have been quantitatively derived from the data and associated classification labels or regression targets are input to an iterative optimization scheme to find classification decision boundaries in the feature space, appropriate feature weights to predict regression targets, or both. The learning process is carried out on training data that are representative of the data to which the machine learning model is to be applied. The performance of a machine learning model is evaluated using a metric that computes either the proportion of examples for which the model produced incorrect classes for classification tasks, or the error rate of predicted target values for regression tasks. The performance of an algorithm on unseen data determines its generalizability, a measure of how well it will perform on new data. Therefore, performance measures are computed using test data that are separate from the training data used to train the machine learning model. In addition to performing classification or regression, a machine learning algorithm needs to account for missing data and noisy or corrupted signals to perform well. The present invention uses features derived from scattered X-ray signals and wellbore characteristics as targets to iteratively train a machine learning algorithm resulting in a model that predicts wellbore characteristics from scattered X-ray signals.

This disclosure describes a method for well integrity assessment using machine-trained prediction of physical characteristics related to well integrity across a depth interval of a cased wellbore having one or more casing strings. In one embodiment, the method includes the steps of (i) collecting scattered X-ray signals from a plurality of X-ray detectors arranged within a well logging tool while that tool operates in one or more wellbores with known wellbore characteristics, (ii) associating the known wellbore characteristics with the collected scattered X-ray signals, (iii) training a machine learning model using the collected scattered X-ray signals and associated wellbore characteristics to produce a trained model that predicts wellbore characteristics from scattered X-ray signals, (iv) collecting further scattered X-ray signals from the plurality of X-ray detectors, (v) predicting unknown wellbore characteristics from the collected further scattered X-ray signals using the trained model, and (vi) assessing the well integrity using the predicted wellbore characteristics.

Figure 4:
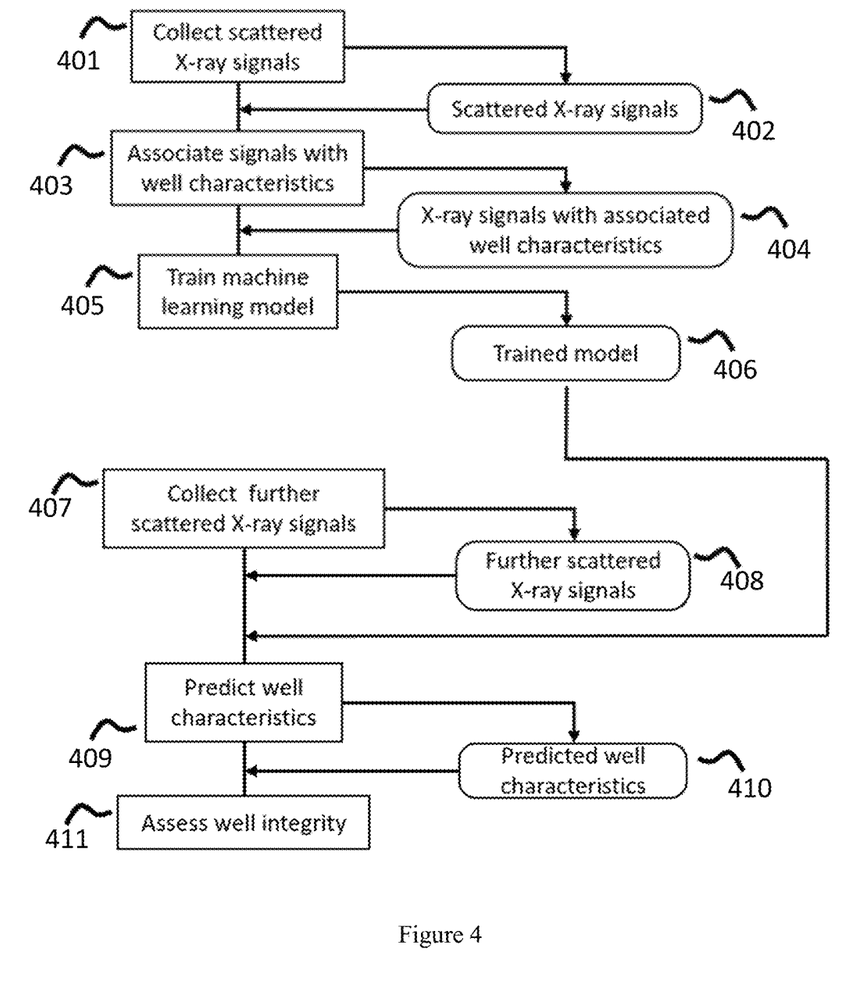
FIG. 4 is a flowchart outlining the main steps for well integrity assessment using machine-trained prediction of physical characteristics related to well integrity from scattered X-ray signals.

The flowchart in FIG. 4 illustrates an exemplary workflow. The steps are shown in rectangles on the left and the inputs or outputs are shown in rounded rectangles on the right. First, scattered X-ray signals are collected 401 from one or more wellbores with known wellbore characteristics to create a scattered X-ray signal data set 402 and associated 403 with the known wellbore characteristics to produce a data set of X-ray signals and associated wellbore characteristics 404. Then, the machine learning model is trained and tested 405 using the X-ray signals and associated wellbore characteristics 404 as input. During training, the algorithm learns the nonlinear function mapping the wellbore characteristics to the scattered X-ray signals. The learning process employs an optimization scheme that iteratively updates the feature weights to minimize error between the known wellbore characteristics from the training data set and wellbore characteristics predicted by the machine learning model. The result is a trained machine learning model 406 that predicts wellbore characteristics from X-ray signals. Next, further scattered X-ray signals 408 are collected 407 and wellbore characteristics 410 are predicted 409 using the trained model 406. Finally, well integrity is assessed 411 using the predicted wellbore characteristics 410.

In one embodiment, the step of collecting scattered X-ray signals from a plurality of detectors in one or more wellbores with known wellbore characteristics comprises collecting said signals from the output of a computer-based simulation of X-ray transport in an a-priori-defined wellbore geometry, such as can be obtained using the Monte Carlo N-Particle transport code. In a further embodiment, said signals are collected from one or more laboratory mock-ups of a wellbore. In a further embodiment, said signals are collected from one or more wellbores drilled into the Earth. In a further embodiment, said signals are collected from a combination of two or more of these modes.

In one embodiment, the steps of collecting scattered X-ray signals from a plurality of detectors in one or more wellbores with known wellbore characteristics and collecting further scattered X-ray signals from a plurality of detectors involves collecting signals from all of the plurality of detectors synchronously. In this case, each of the plurality of detectors is interrogating approximately the same depth interval within the well during a given exposure. In an alternate embodiment, the scattered X-ray signals from each of the plurality of detectors are collected asynchronously. In this case, each of the plurality of detectors is interrogating different depth intervals within the well during their respective exposures, and thus, each detector's signal must be associated with the wellbore parameters relevant to the position of that detector in the wellbore at the time during which its signal was acquired. In a further embodiment, well characteristics predicted by asynchronously-acquired further scattered X-ray signals are adjusted for differences in interrogated depth intervals before assessing the well integrity.

In one embodiment of the method, the collected scattered X-ray signals and collected further scattered X-ray signals comprise only signals above a certain X-ray energy threshold. In a further embodiment, the collected scattered X-ray signals and collected further scattered X-ray signals comprise signals above two or more X-ray energy thresholds. In a further embodiment, the collected scattered X-ray signals and collected further scattered X-ray signals comprise signals below one or more X-ray energy thresholds. In a further embodiment, the collected scattered X-ray signals and collected further scattered X-ray signals comprise signals between two or more X-ray energy thresholds.

The wellbore characteristics to which the scattered signals are associated can include one or more of wellbore fluid density, wellbore fluid photoelectric factor, wellbore fluid composition, eccentricity of the wellbore logging tool within the innermost casing, thickness of wellbore fluid between the wellbore logging tool housing and innermost casing, inner diameter of one or more casing strings, outer diameter of one or more casing strings, thickness of one or more casing strings, eccentricity of one or more casing strings within the borehole or within a further casing string, density of any deposits on the one or more casing strings, photoelectric factor of any deposits on the one or more casing strings, composition of any deposits on the one or more casing strings, thickness of any deposits on the one or more casing strings, density of the materials in one or more annular regions, photoelectric factor of the materials in one or more cannular regions, composition of the materials in one or more annular regions, thickness of one or more annular regions, density of the formation, photoelectric factor of the formation, composition of the formation, borehole diameter, borehole ovality, and signals from other types of wellbore logging tools.

Similarly, the wellbore characteristics that are predicted by the machine learning model can include one or more of wellbore fluid density, wellbore fluid photoelectric factor, wellbore fluid composition, eccentricity of the wellbore logging tool within the innermost casing, thickness of wellbore fluid between the wellbore logging tool housing and innermost casing, inner diameter of one or more casing strings, outer diameter of one or more casing strings, thickness of one or more casing strings, eccentricity of one or more casing strings within the borehole or within a further casing string, density of any deposits on the one or more casing strings, photoelectric factor of any deposits on the one or more casing strings, composition of any deposits on the one or more casing strings, thickness of any deposits on the one or more casing strings, density of the materials in one or more annular regions, photoelectric factor of the materials in one or more cannular regions, composition of the materials in one or more annular regions, thickness of one or more annular regions, density of the formation, photoelectric factor of the formation, composition of the formation, borehole diameter, borehole ovality, and signals from other types of wellbore logging tools.

In one embodiment of the method, the steps of training and applying the machine learning model comprise training and applying the model for each detector exposure individually. This means treating each measurement as independent in time from the measurements preceding or following that measurement and treating the wellbore characteristics being interrogated by the scattered X-ray signals or predicted by the model as independent in depth from the characteristics above or below the depth at which the given signal was acquired.

In a further embodiment of the method, the steps training and applying the machine learning model comprise training and applying the model for two or more detector exposures in conjunction. This approach recognizes that the spatial sensitivity region of each detector may be larger than the depth spacing of the individual exposure measurements (dependent upon logging speed and exposure time). Hence, measurements from subsequent exposures interrogate partially overlapping regions of the well. Combining the measurements from two or more exposures adjacent in time during the training and application of the machine learning model can result in improved accuracy and higher resolution in predictions of the wellbore characteristics.

In one embodiment of the method, the steps of training and applying the machine learning model comprise training and applying the model for each axial detector individually. This means treating the axial and radial regions of sensitivity of each detector as independent from the axial and radial regions of sensitivity of the other detectors and treating the wellbore characteristics being interrogated by the scattered X-ray signals or predicted by the model as axially- and radially-independent from the characteristics interrogated by the scattered X-ray signal of the other detectors.

In a further embodiment of the method, the steps of training and applying the machine learning model comprise training and applying the model for detectors at two or more different axial positions in conjunction. This approach recognizes that the axial and radial sensitivity regions of each axially-spaced detector may be different. Hence, measurements from different axially-spaced detectors interrogate different axial and radial regions of the well. Combining the measurements from two or more axially-spaced detectors during the training and application of the machine learning model can result in improved accuracy and higher resolution in predictions of the wellbore characteristics.

In one embodiment of the method, the steps of training and applying the machine learning model comprise training and applying the model for each detector azimuth individually. This means treating the azimuthal region of sensitivity of each detector as independent from the azimuthal region of sensitivity of the other detectors and treating the wellbore characteristics being interrogated by the scattered X-ray signals or predicted by the model as azimuthally independent from the characteristics interrogated by the scattered X-ray signal of the other detectors.

In a further embodiment of the method, the steps of training and applying the machine learning model comprise training and applying the model for detectors aimed in two or more different azimuthal directions in conjunction. This approach recognizes that the azimuthal sensitivity region of each azimuthally-spaced detector may be larger than the azimuthal spacing of the detectors. Hence, measurements from different azimuthally-spaced detectors interrogate partially-overlapping azimuthal regions of the well. Combining the measurements from two or more azimuthally-spaced detectors during the training and application of the machine learning model can result in improved accuracy and higher resolution in predictions of the wellbore characteristics.

In one embodiment of the method, the steps of training and applying the machine learning model comprise training and applying the model with signals above only one X-ray energy threshold. In a further embodiment, the steps of training and applying the machine learning model comprise training and applying the model with signals above two or more X-ray energy thresholds individually. In a further embodiment, the steps of training and applying the machine learning model comprise training and applying the model to signals above two or more X-ray energy thresholds in conjunction. This recognizes that detected X-rays of different energies contain differentiated, but related information about the wellbore characteristics. In a further embodiment, the steps of training and applying the machine learning model comprise training and applying the model to signals below two or more X-ray energy thresholds in conjunction. In a further embodiment, the steps of training and applying the machine learning model comprise training and applying the model to signals between two or more X-ray energy thresholds in conjunction.

In one embodiment, the steps of training and applying the machine learning model involve training and applying the model to perform regression. The machine learning model can use any type of regressor, such as neural network, decision tree, random forest, support vector machine, Bayesian learner, or genetic algorithm.

In one embodiment, the step of training the machine learning model involves partitioning the collected scattered X-ray signals and associated wellbore characteristics into training and test data sets. The model is trained using only data from the training data set and the data from the test data set are used to evaluate the performance of the final trained model on unseen data.

In a further embodiment, the step of training the machine learning model involves partitioning the collected scattered X-ray signals and associated wellbore characteristics into training, validation, and test datasets. The model is fitted using only data from the training data set. Then, the fitted model is applied to the data in the validation data set and the error between the predicted wellbore parameters from the fitted model applied to the validation data and the known wellbore parameters from the validation data is evaluated. This evaluation of model performance on data from the validation data set is used to improve overall model performance by, for example, guiding the tuning of model hyperparameters or determining when to stop training to avoid overfitting. The evaluation of model performance is fed back into fitting the model again, and the validation process is repeated until stopping criteria are met. Finally, the data from the test data set are used to evaluate the performance of the trained model on unseen data.

In a further embodiment, the step of training the machine learning model employs cross-validation to produce a more generalized trained model. Cross-validation accounts for the bias-variance tradeoff in the model error and produces better generalizability on unseen data. The cross-validation method can be any appropriate method, such as K-fold cross-validation, leave-one-out cross-validation, or random subsampling. In a further embodiment, the step of training the machine learning model employs nested cross-validation. In a further embodiment, the step of training the machine learning model involves sequentially fitting the model to different partitions of the collected scattered X-ray signals and associated wellbore characteristics data set using the fitted model parameters from one partition as the starting model parameters for fitting the next partition.

Figure 5:
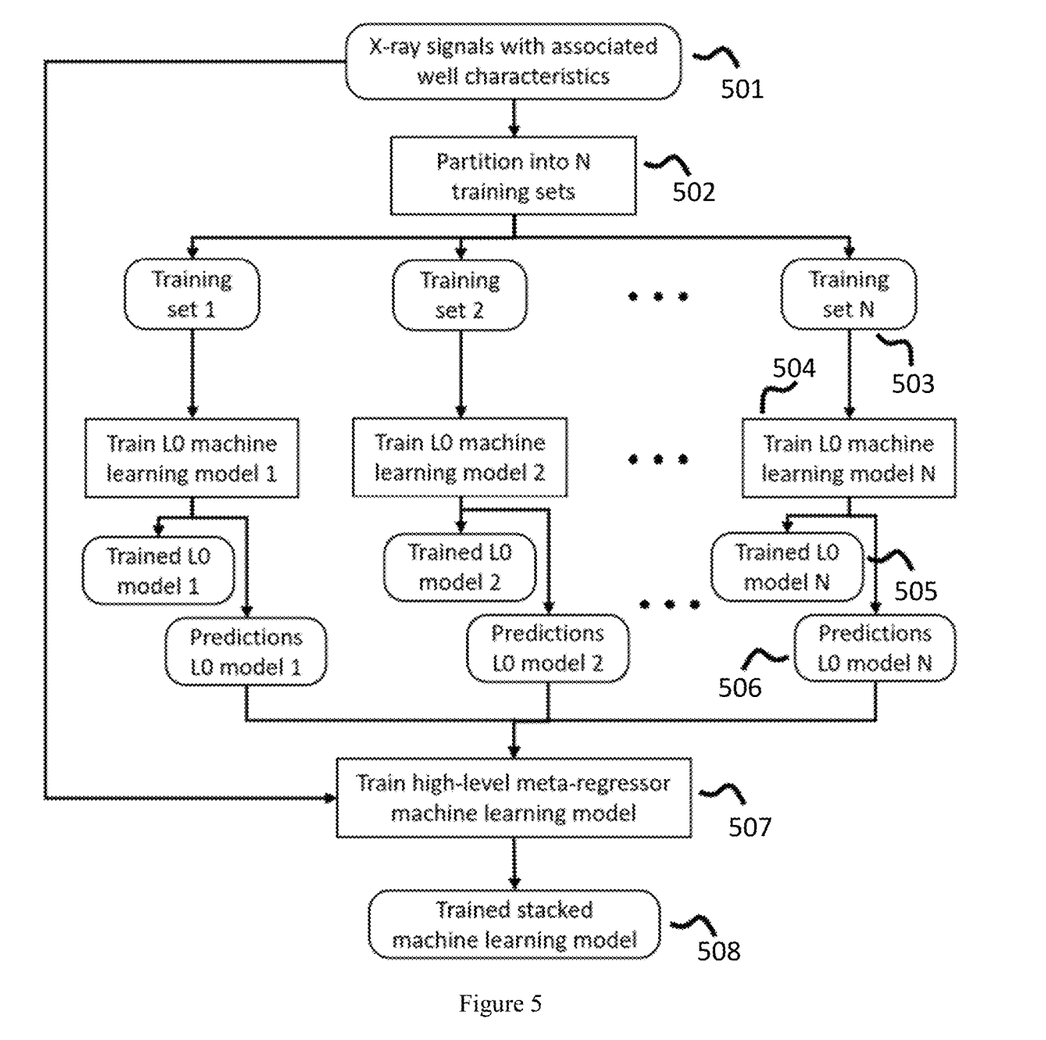
FIG. 5 is a flowchart for well integrity assessment using machine-trained prediction of physical characteristics related to well integrity from scattered X-ray signals including the additional steps of stacked generalization.

In one embodiment, the step of training the machine learning model employs stacked generalization, which is a method for combining predictions from different machine learning models to produce a final predictor that provides more accurate predictions of the targets than any of the component machine learning models independently. Predictors are hierarchically stacked based on their complexity, where high-level meta learners take predicted features from lower-level predictors, effectively reducing the generalization error on the original learning set. The flowchart in FIG. 5 depicts an exemplary stacked generalization method involving N independent machine learning regression models, where N can be any number greater than 1. First, the collected scattered X-ray signals and associated wellbore characteristics 501 are partitioned 502 into N unique training data sets 503. Next, each of N low-level (L0) machine learning regression models is trained 504 using one of the N training data sets 503. Each L0 model learns the bias and generalization with respect to the partition of the training data set used to train it. The output at this stage is N trained L0 machine learning models 505 and the predicted wellbore characteristics 506 that each trained L0 model outputs for its respective training data set. Next, the high-level meta-regressor machine learning model is trained 507 using the predictions from the L0 models 506 and the original full training data set 501. The high-level meta-regressor optimally combines the predictions from the trained L0 models 505 to produce a more accurate final prediction of the wellbore characteristics and reduce generalization error. The final output is a trained stacked machine learning model 508 that predicts wellbore characteristics from scattered X-ray signals. The L0 regressors can be any type of regressor, such as neural networks, decision trees, random forests, support vector machines, or Bayesian learners. The higher-level regressor can be any regressor that is global, non-volatile, and smooth, such as neural networks or genetic algorithms. The L0 machine learning models can take as input scattered X-ray signals from all detectors or from a subset of the detectors and predict as output all wellbore characteristics or a subset of the wellbore characteristics. Similarly, the high-level meta-regressor can predict either the full set of wellbore characteristics or the remaining characteristics not predicted by the L0 regressors.

In a further embodiment, the step of training the machine learning model employing stacked generalization includes the further step of cross validation. In particular, the step of partitioning the collected X-ray signals and associated wellbore characteristics into N independent training data sets comprises partitioning the collected X-ray signals and associated wellbore characteristics into N independent groups of training, validation and test data sets. The N independent groups of training, validation and test data sets are used to train and validate the N L0 regressor machine learning models.

In one embodiment, the steps of training and applying the machine learning model involve pre-processing of the scattered X-ray signal data to account for missing or corrupted data. This can be done either by interpolating the missing or corrupted data point using any appropriate interpolation method or by removing all data points associated with the missing or corrupted data point (for example, if data from one detector is missing at a given time, then the data from all other detectors at that same time is excluded from analysis). In a further embodiment, this pre-processing can involve removing duplicate data points.

In a further embodiment, the step of training the machine learning model uses data augmentation to increase the size of the training data set. Data augmentation can comprise interpolating between existing data points along one or more wellbore characteristic dimensions in order to more fully cover the wellbore characteristics parameter space. For example, if the initial data set of scattered X-ray signals and associated wellbore characteristics includes the scattered X-ray signals for N unique values of annular cement density, data augmentation can be used to increase the data set of scattered X-ray signals and associated wellbore characteristics to 2N−1 unique values of annular cement density by interpolating the scattered X-rays signals between each of the N original values. Data augmentation can further comprise the addition of noise to the scattered X-ray signals in the initial data set of scattered X-ray signals and associated wellbore characteristics. Adding noise is necessary in cases where simulation or computational data are used for training the machine learning model because data created in these manners often does not contain noise or fluctuations at the level expected in field data. Adding noise to the training data is beneficial because the machine learning model will learn to account for the noise and thus make more accurate predictions when applied to the further collected scattered X-ray signals that may contain noise. The noise can be added in any appropriate manner and be of any appropriate form, such as statistical counting uncertainty (square root of detector counts), simulation or computational uncertainty, and estimates of detector gain or offset fluctuations.

Figure 6:
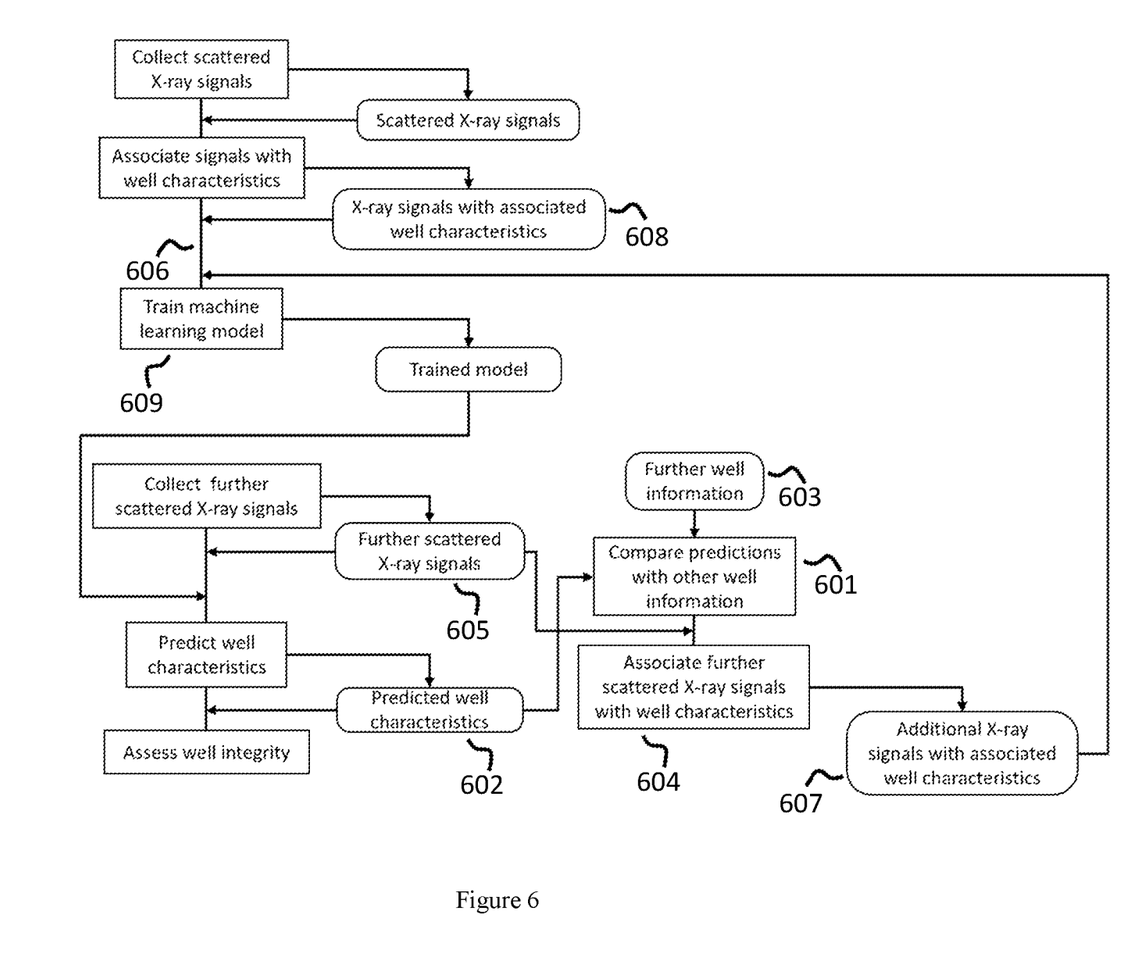
FIG. 6 is a flowchart for well integrity assessment using machine-trained prediction of physical characteristics related to well integrity from scattered X-ray signals including the additional steps of continuous learning.

In another embodiment of this invention, the collected further X-ray signals are used to implement a continuous learning framework. As shown in FIG. 6, the continuous learning framework includes the added steps of comparing 601 the predicted well characteristics 602 with further information 603 about the well characteristics, associating 604 the further scattered X-ray signals 605 with well characteristics, and adding 606 the additional X-ray signals with associated well characteristics 607 to the original X-ray signals with associated well characteristics 608 to re-train 609 the machine learning model.

Figure 7:
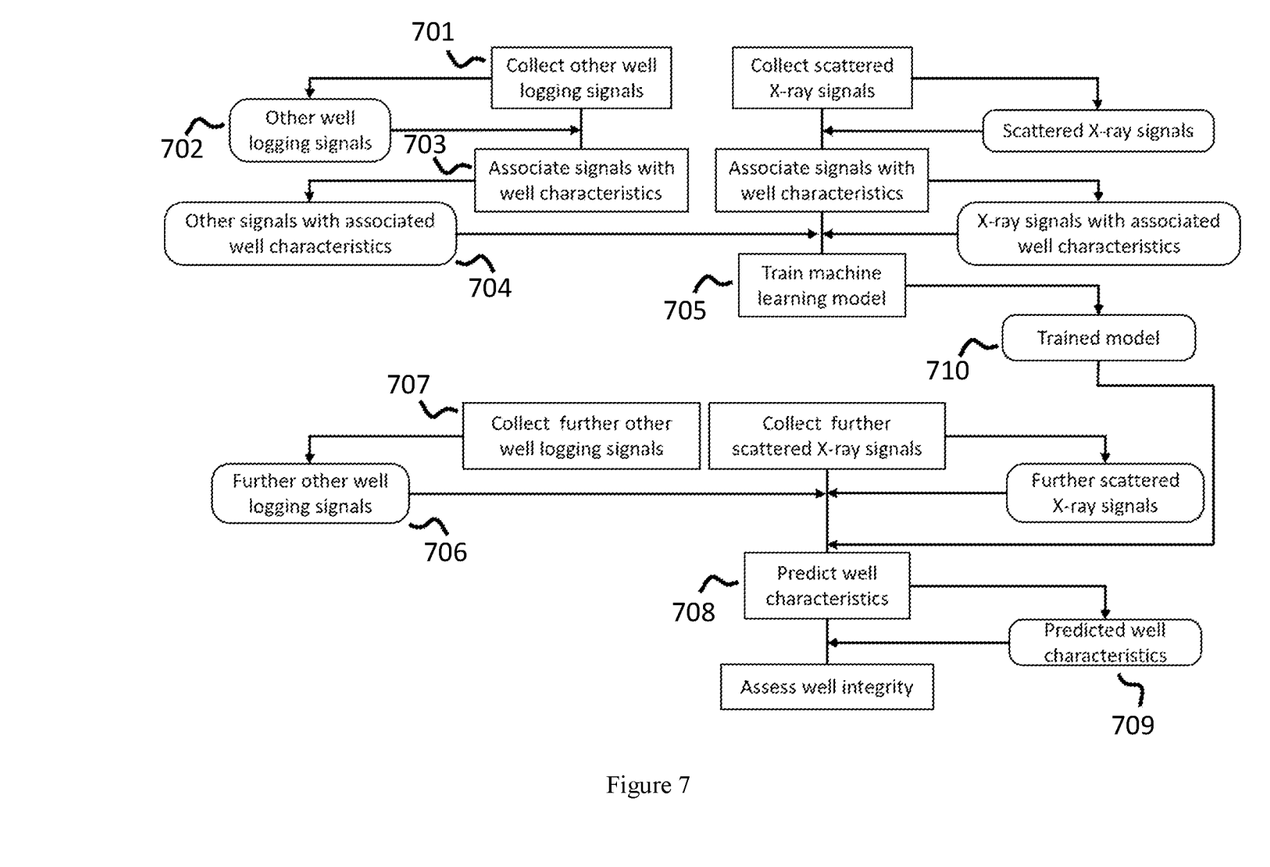
FIG. 7 is a flowchart for well integrity assessment using machine-trained prediction of physical characteristics related to well integrity from scattered X-ray signals including the additional steps of collecting signals from other types of logging tools and incorporating those signals into the machine learning model.

In another embodiment of the method, illustrated by the flowchart in FIG. 7, the steps of training and applying the machine learning model take as input not only scattered X-ray data, but also data from other types of well logging tools. This embodiment includes the addition steps of collecting 701 signals from one or more other types of well logging tool. These signals 702 from one or more additional types of well logging tool are associated 703 with well characteristics and the other signals with associated well characteristics 704 are used as additional input for training 705 the machine learning model. Then, further other well logging signals 706 are collected 707 and used as additional input for the prediction 708 of well characteristics 709 using the trained machine learning model 710. Including signals from one or more additional types of well logging tools permits more accurate prediction of the wellbore characteristics and prediction of one or more additional wellbore characteristics.

The one or more other types of well logging tools can be drawn from among sonic tools, ultrasonic tools, neutron tools, resistivity tools, electromagnetic induction tools, nuclear magnetic resonance tools, natural gamma tools, casing collar locators, and calipers. The one or more additional wellbore characteristics can be drawn from among acoustic wave speeds, acoustic impedance, cement bond parameters, cement bond state, physical state of annular materials (solid/liquid/gas), cement porosity, formation porosity, formation resistivity, formation type, inner diameter of inner-most casing string, and presence of scale. The one or more additional wellbore characteristics can be for any of the wellbore fluid, one or more casing strings, one or more annular regions, or formation.

Figure 8:
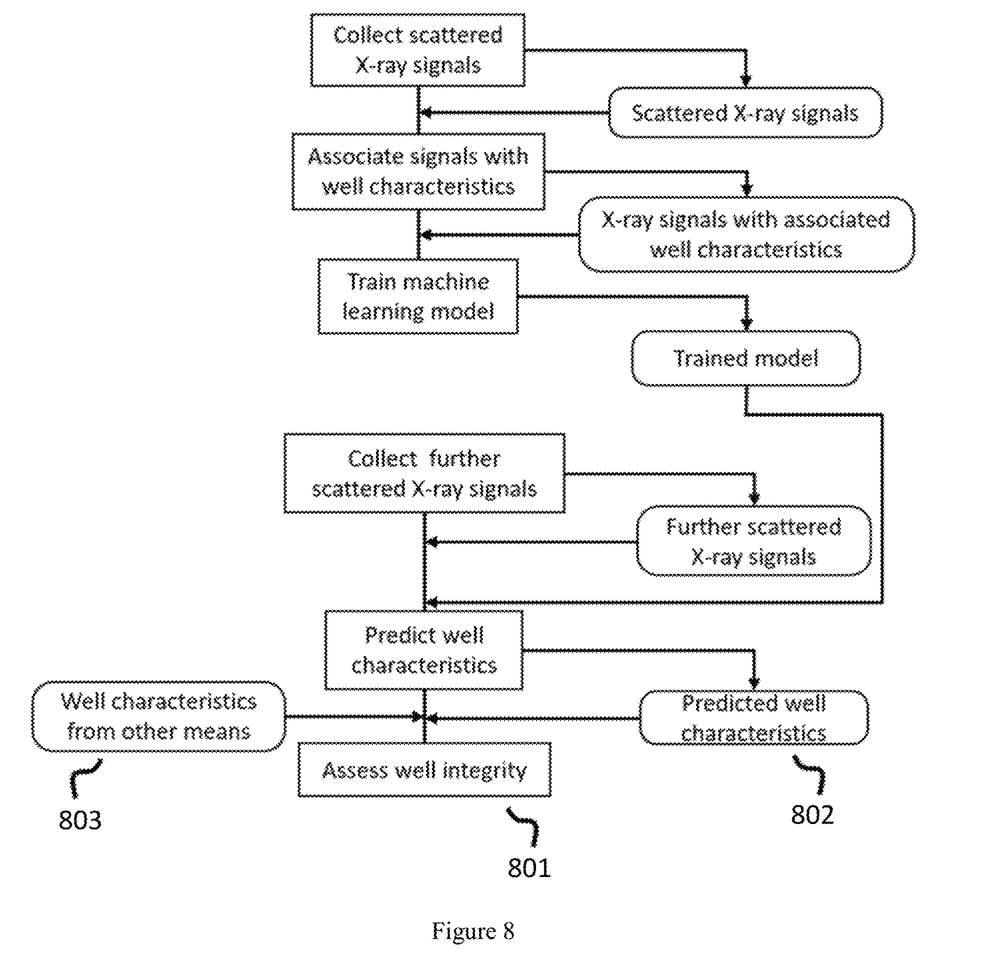
FIG. 8 is a flowchart for well integrity assessment using machine-trained prediction of physical characteristics related to well integrity from scattered X-ray signals including the additional step of using well characteristics from additional means in the assessment of well integrity.

In another embodiment of the method, illustrated by the flowchart in FIG. 8, the step of assessing 801 the well integrity using the predicted wellbore characteristics 802 further includes using wellbore characteristics derived from additional means 803. These wellbore characteristics derived from additional means can be the same wellbore characteristics as predicted from the machine learning analysis of the scattered X-ray signals or additional wellbore characteristics not predicted from the machine learning analysis of the scattered X-ray signals. The additional wellbore characteristics can be quantitative characteristics, such as acoustic wave speeds, acoustic impedance, cement bond parameters, cement bond state, physical state of annular materials (solid/liquid/gas), cement porosity, formation porosity, formation resistivity, formation type, inner diameter of inner-most casing string, and presence of scale, or qualitative characteristics, such as assessments of bond quality or hydraulic isolation. The additional means can be alternative types of well logging tools, such as sonic tools, ultrasonic tools, neutron tools, resistivity tools, electromagnetic induction tools, nuclear magnetic resonance tools, natural gamma tools, casing collar locators, and calipers, or can be alternative processing methods for the scattered X-ray signals. The wellbore characteristics derived from additional means can be obtained using any appropriate processing methods for data obtained from any of the alternative types of well logging tools, including processing using machine learning. The well characteristics from other means can be combined with the predicted well characteristics to assess well integrity in any appropriate manner, such as through joint interpretation by a human, through modality merging, or via another machine learning algorithm.

In another embodiment, the predicted wellbore characteristics are further applied towards filling in missing data from other types of well logging tools. If well logging signals from other types of well logging tools are included in the predictions made by the machine learning model, then the predictions of these other well logging signals could be used to correct missing or corrupted data points in well logs acquired by these other types of well logging tools. The logs could be new logs or logs acquired at some time in the past. The corrected well log could be used in isolation to assess well integrity or in combination with scattered X-ray data. The corrected well log could be used in routines for further processing of the other well logging signals.

In an alternate embodiment, the machine learning model is trained to predict X-ray scattering signals from other types of well logging signals. These predicted scattered X-ray signals could be used to fill in missing data from a well log containing scattered X-ray data or used directly to assess well integrity.

In an alternate embodiment, the steps of training and applying the machine learning model involve training and applying the model to perform classification. The machine learning model can use any type of classifier, such as neural network, decision tree, random forest, support vector machine, Bayesian learner, or genetic algorithm. Classes can be assigned by associating an appropriate class with the scattered X-ray signals at the step of associating the signals with wellbore characteristics. Alternately, classes can be derived from one or more outputs of the regression algorithm by applying appropriate thresholds on the predicted variables to obtain qualitative measures, such as good—bad—indeterminate cement quality. The classification task to create groups or classes can be accomplished either with a machine learning algorithm, manual sorting and evaluation by a human expert, or any other appropriate method.

The foregoing specification is provided only for illustrative purposes and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. A method for well integrity assessment across a depth interval of a cased wellbore having one or more casing strings using machine learning, comprising:
   a. collecting scattered X-ray signals from a plurality of X-ray detectors arranged within a well logging tool while that tool operates in one or more wellbores with known wellbore characteristics;
   b. associating the known wellbore characteristics with the collected scattered X-ray signals;
   c. training a machine learning model using the collected scattered X-ray signals and associated wellbore characteristics to produce a trained model that predicts wellbore characteristics from scattered X-ray signals;
   d. collecting further scattered X-ray signals from the plurality of X-ray detectors arranged within a well logging tool while that tool operates in a wellbore with unknown wellbore characteristics;
   e. applying the trained machine learning model to the collected further scattered X-ray signals to predict unknown wellbore characteristics; and
   f. assessing the well integrity using the predicted wellbore, characteristics,
   g. wherein the steps of collecting the scattered X-ray signals and collecting the further scattered X-ray signals each comprise collecting the signals synchronously from all of the plurality of detectors, and
   h. wherein the steps of training the machine learning model using the scattered X-ray signals arising from X-rays above one or more energy thresholds and applying the trained machine learning model to the further scattered X-ray signals arising from X-rays above one or more energy thresholds comprise training the machine learning model and applying the trained machine learning model using X-ray signals from two or more energy thresholds in conjunction.

2. The method of claim 1, wherein the cased wellbore further contains production tubing or a production liner.

3. The method of claim 1, wherein the step of collecting the scattered X-ray signals comprises collecting the scattered X-ray signals from the output of a computational simulation of X-ray transport in a known wellbore geometry.

4. The method of claim 1, wherein the scattered X-ray signals and the further scattered X-ray signals each comprise only the signals arising from X-rays above one or more energy thresholds.

5. The method of claim 1 wherein the steps of training the machine learning model using the scattered X-ray signals arising from X-rays above one or more energy thresholds and applying the trained machine learning model to the further scattered X-ray signals arising from X-rays above one or more energy thresholds comprise training the machine learning model and applying the trained machine learning model using X-ray signals from the one or more energy thresholds individually.

6. The method of claim 1, wherein the wellbore characteristics comprise one or more of wellbore fluid density, wellbore fluid composition, thickness of one or more casings, eccentricity of one or more casings, density of material in one or more annuli, thickness of one or more annuli, formation density.

7. The method of claim 1, wherein the steps of training the machine learning model using the scattered X-ray signals and applying the trained machine learning model to the further scattered X-ray signals comprise training the machine learning model and applying the trained machine learning model for the scattered X-ray signals and further scattered X-ray signals contained in each detector exposure independently of the signals contained in other exposures.

8. The method of claim 1, wherein the steps of training the machine learning model using the scattered X-ray signals and applying the trained machine learning model to the further scattered X-ray signals comprise training the machine learning model and applying the trained machine learning model for the scattered X-ray signals and further scattered X-ray signals from two or more axial detectors in conjunction.

9. The method of claim 1, wherein the steps of training, the machine learning, model using the scattered X-ray signals and applying the trained machine learning model to the further scattered X-ray signals comprise training the machine learning model and applying the trained machine learning model for the scattered X-ray signals, and further scattered X-ray signals from each detector azimuth individually.

10. The method of claim 1, wherein the steps of training the machine learning model using the scattered X-ray signals and applying the trained machine learning model to the further scattered X-ray signals comprise training the machine learning model and applying the trained machine learning model for the scattered X-ray signals and further scattered X-ray signals from two or more detector azimuths in conjunction.

11. The method of claim 1, wherein the machine learning model comprises a neural network, a decision tree, a random forest, a support vector machine, a Bayesian learner, a genetic algorithm, or any combination thereof.

12. The method of claim 1, wherein the step of training the machine learning model comprises:
  a. partitioning the collected scattered X-ray signals, into training, validation and test datasets;
  b. fitting the model using only scattered X-ray signals from the training dataset;
  c. evaluating model performance using the scattered X-ray signals from the validation dataset;
  d. improving overall model performance based on the evaluation of model performance; and
  e. evaluating the final trained, model performance using the scattered X-ray signals from the test dataset.

13. The method of claim 1, wherein the step of training the machine learning model comprises training the machine learning model using stacked generalization.

14. The method of claim 1, wherein the steps of training the machine learning model and applying the trained machine learning model comprise pre-processing the scattered X-ray signals and further scattered X-ray signals to account for missing, corrupted, or duplicate data.

15. The method of claim 1, wherein the step of training the machine learning model comprises training the machine learning model on collected scattered X-ray signals augmented by interpolating among the collected scattered X-ray signals with respect to one or more wellbore characteristics, adding noise to the collected scattered X-ray signals, or both.

16. The method of claim 1, further comprising:
  a. collecting signals from one or more other types of well logging tools while the tools operate in one or more wellbores with known wellbore characteristics;
  b. associating the known wellbore characteristics with the collected signals from the other types of well logging tools;
  c. training a machine learning model using the collected scattered X-ray signals, the collected signals from other types of well logging tools, and the associated wellbore characteristics to produce a trained model that predicts wellbore characteristics from these inputs;
  d. collecting further signals from the other types of well logging tools in one or more wellbores with unknown wellbore characteristics; and
  e. applying the trained machine learning model to the collected further scattered X-ray signals and collected further signals from other types of well logging tools to predict unknown wellbore characteristics.

17. The method of claim 15, wherein the one or more other types of well logging tools comprise sonic tools, ultrasonic tools, electromagnetic induction tools, nuclear magnetic resonance tools, neutron tools, resistivity tools, natural gamma tools, casing collar locators, or calipers.

18. The method of claim 15, wherein the wellbore characteristics further comprise one or more of acoustic wave speeds, acoustic impedance, cement bond parameters, cement bond state, physical state of annular materials (solid/liquid/gas), cement porosity, formation porosity, formation resistivity, formation type, inner diameter of inner-most casing string, and presence of scale.

19. The method of claim 1, further comprising deriving wellbore characteristics from means other than scattered X-ray signals and using the wellbore characteristics from the means other than scattered X-ray signals in conjunction with the wellbore characteristics predicted by the trained machine learning model to assess well integrity.

* * * * *